(12) United States Patent
Luczak

(10) Patent No.: US 9,410,439 B2
(45) Date of Patent: Aug. 9, 2016

(54) CMC BLADE ATTACHMENT SHIM RELIEF

(75) Inventor: Blake J. Luczak, Pittsburgh, PA (US)

(73) Assignee: United Technologies Corporation, Hartford, CT (US)

( * ) Notice: Subject to any disclaimer, the term of this patent is extended or adjusted under 35 U.S.C. 154(b) by 876 days.

(21) Appl. No.: 13/617,961

(22) Filed: Sep. 14, 2012

(65) Prior Publication Data

US 2014/0079559 A1 Mar. 20, 2014

(51) Int. Cl.
*F01D 5/30* (2006.01)
*F01D 5/28* (2006.01)

(52) U.S. Cl.
CPC ............. *F01D 5/3007* (2013.01); *F01D 5/284* (2013.01); *F01D 5/3092* (2013.01); *F05D 2250/71* (2013.01); *F05D 2300/6033* (2013.01); *F05D 2300/611* (2013.01); *Y02T 50/672* (2013.01)

(58) Field of Classification Search
CPC ....... F01D 5/282; F01D 5/288; F01D 5/3007; F01D 5/3084; F01D 5/3092; F01D 5/326; F01D 5/3015; F01D 5/3069; F01D 5/323; F01D 5/284; F05D 2250/71; F05D 2300/6033; F05D 2300/611; Y02T 50/672
See application file for complete search history.

(56) References Cited

U.S. PATENT DOCUMENTS

| 4,767,274 | A | * | 8/1988 | Walter ....................... 416/193 A |
| 6,290,466 | B1 | | 9/2001 | Ravenhall et al. |
| 6,533,550 | B1 | | 3/2003 | Mills |
| 6,751,863 | B2 | * | 6/2004 | Tefft ........................ 29/889.21 |
| 6,857,856 | B2 | | 2/2005 | Potter et al. |
| 6,860,722 | B2 | * | 3/2005 | Forrester et al. .......... 416/219 R |
| 6,910,866 | B2 | * | 6/2005 | Bassot et al. .................. 416/221 |
| 7,223,465 | B2 | | 5/2007 | Subramanian et al. |
| 7,300,255 | B2 | | 11/2007 | Potter et al. |
| 7,329,101 | B2 | | 2/2008 | Carper et al. |

(Continued)

FOREIGN PATENT DOCUMENTS

| FR | 2959271 A1 | 10/2011 |
| JP | H08326503 A | 12/1996 |

(Continued)

OTHER PUBLICATIONS

International Search Report and Written Opinion, dated Jun. 24, 2014, for PCT Application No. PCT/US2013/059033, 15 pages.

(Continued)

*Primary Examiner* — Christopher Verdier
*Assistant Examiner* — Adam W Brown
(74) *Attorney, Agent, or Firm* — Kinney & Lange, P.A.

(57) ABSTRACT

A blade root shim comprises a base, a suction side shim wall, a pressure side shim wall, and a contact relief region. The base extends longitudinally between a leading shim end and a trailing shim end. The suction side shim wall extends along the base and corresponds to a suction side blade root bearing surface. The pressure side shim wall, spaced circumferentially apart from the suction shim wall, corresponds to a pressure side blade bearing surface. The contact relief region is formed into an upper wall portion of either the suction side shim wall or the pressure side shim wall.

22 Claims, 7 Drawing Sheets

(56) References Cited

U.S. PATENT DOCUMENTS

| | | |
|---|---|---|
| 7,384,240 B2 * | 6/2008 | McMillan et al. ............ 416/131 |
| 7,968,031 B2 | 6/2011 | Carper et al. |
| 9,103,220 B2 * | 8/2015 | Garin ..................... F01D 5/081 |
| 2002/0044870 A1 | 4/2002 | Simoneti et al. |
| 2004/0151590 A1 | 8/2004 | Forrester et al. |
| 2006/0275132 A1 | 12/2006 | McMillan |
| 2009/0263627 A1 * | 10/2009 | Hand et al. .................... 428/172 |
| 2010/0189556 A1 | 7/2010 | Propheter-Hinckley et al. |
| 2011/0206530 A1 | 8/2011 | Fabre |

FOREIGN PATENT DOCUMENTS

| | | | |
|---|---|---|---|
| WO | 2008053230 | 5/2008 | |
| WO | WO2011135234 A2 * | 11/2011 | ............. F01D 5/081 |

OTHER PUBLICATIONS

Extended European Search Report for European Application No. 13859297.7, dated Mar. 21, 2016, 6 pages.

* cited by examiner

CMC BLADE ATTACHMENT SHIM RELIEF

BACKGROUND

Increased operating temperatures of jet engine components advance the performance of the overall engine cycle. Recent technological advancements involve materials such as ceramic matrix composites (CMC's) that are adapted for turbine gas path hardware including blades and vanes capable of withstanding repeated exposure to high combustion and gas path temperatures. These materials have higher temperature capability, lower density, and lower coefficients of thermal expansion than conventional superalloys. However, lower strength capability combined with low coefficients of thermal expansion poses certain challenges for turbine applications.

The lower density of CMC blades allow for higher taper and higher broach angles which can improve thrust recovery from combustion gases. However, the resulting retention stresses can impact the integrity of CMC blades.

SUMMARY

A blade root shim comprises a base, a suction side shim wall, a pressure side shim wall, and a contact relief region. The base extends longitudinally between a leading shim end and a trailing shim end. The suction side shim wall extends along the base and corresponds to a suction side blade root bearing surface. The pressure side shim wall, spaced circumferentially apart from the suction shim wall, corresponds to a pressure side blade bearing surface. The contact relief region is formed into an upper wall portion of either the suction side shim wall or the pressure side shim wall.

A blade assembly comprises a blade and a shim disposed over a blade root section. The shim comprises a base, suction side and pressure side shim walls extending from the base, and a contact relief region aligned with a portion of the blade root section.

A gas turbine rotor assembly comprises a plurality of rotor blades, a rotor disc, and a blade root shim. Each rotor blade includes an airfoil section and a root section. The rotor disc includes a plurality of circumferentially distributed blade retention slots corresponding to the plurality of rotor blades. Each retention slot has at least one bearing surface mating with a bearing surface disposed on the blade root sections. The blade root shim is disposed between one of the plurality of rotor blades and the corresponding blade retention slot. The blade root shim includes a contact relief region formed into at least an upper portion of the blade root shim and aligned with a portion of the blade root section.

A method of assembling a turbine rotor assembly comprises placing a blade root shim having at least one contact relief region over root section of a ceramic matrix composite (CMC) rotor blade. The shim and the rotor blade root section are inserted into a rotor disc radial retention slot. The shim and the rotor blade root section are secured into the retention slot with the at least one contact relief region aligned with a corresponding at least one location of the blade root section.

DETAILED DESCRIPTION

Figure 1:
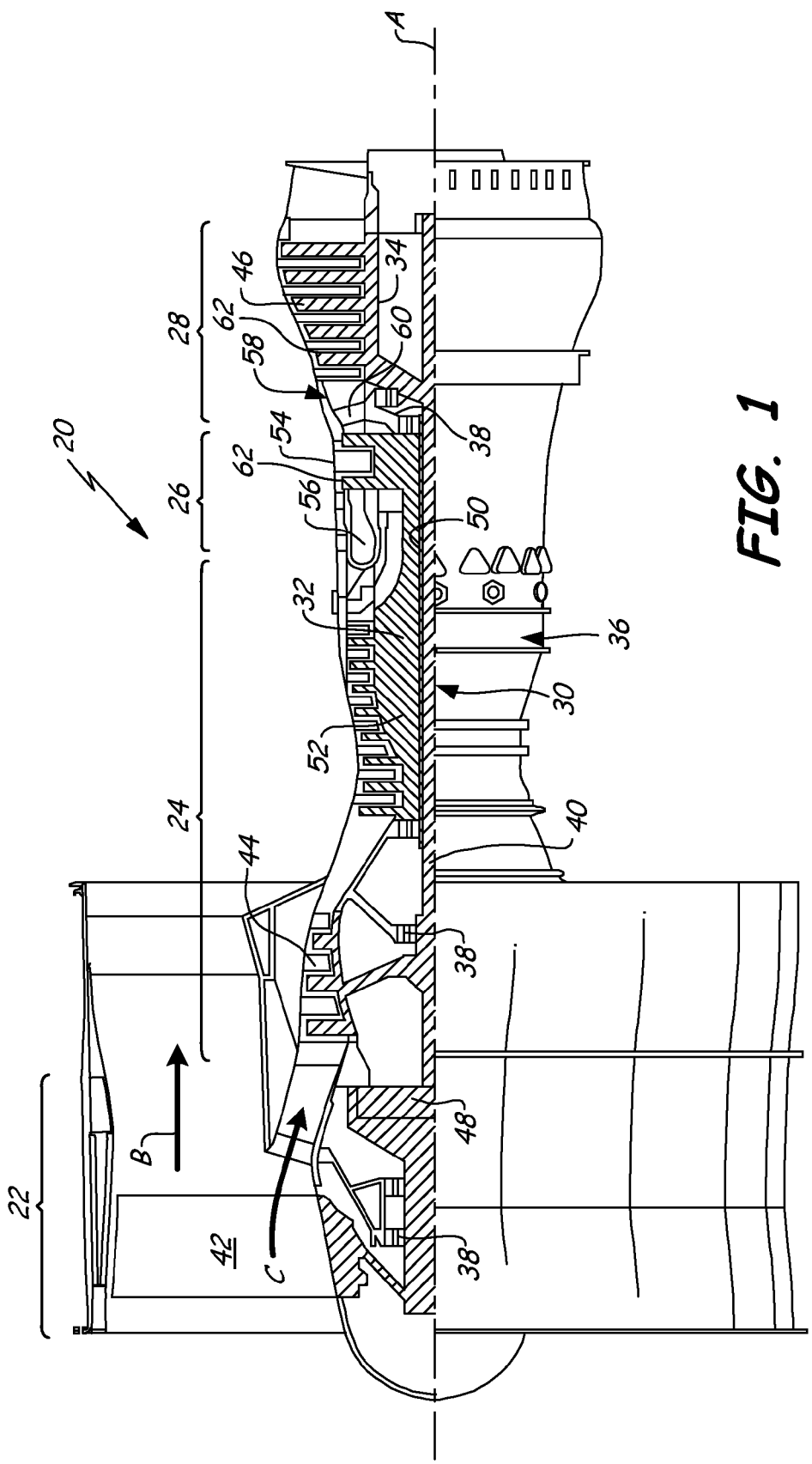
FIG. 1 schematically depicts a cross-section of an example gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. Each stage can include a rotor stage assembly 62 which includes a disc retaining a plurality of circumferentially arranged blades. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle. Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as inlet guide vanes for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption-also known as "bucket cruise Thrust Specific Fuel Consumption ('TSFC')"—is industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R.)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. These rotors may be a rotor assembly 62 as shown below. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
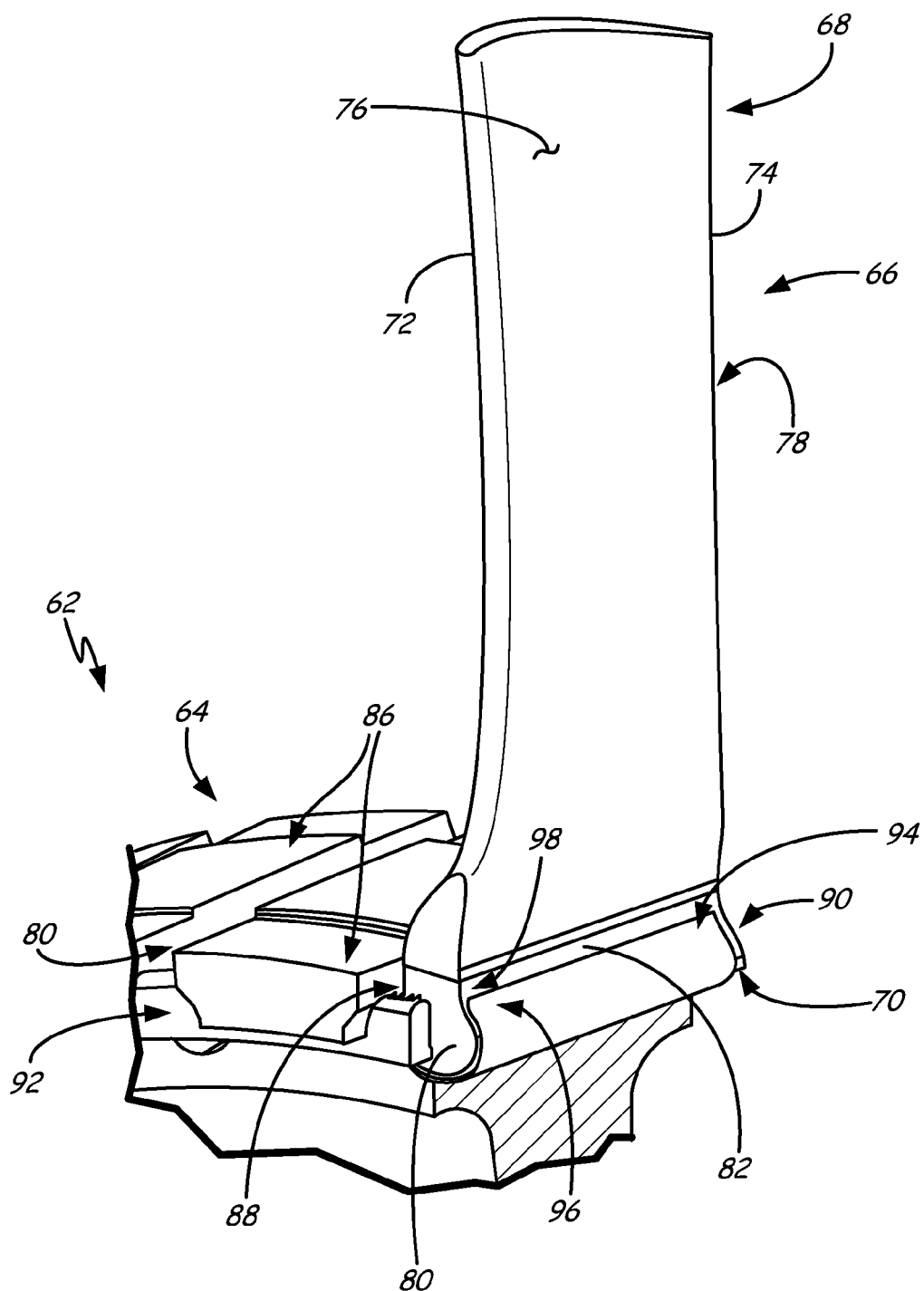
FIG. 2 shows a portion of a turbine rotor assembly retaining a rotor blade and a shim.

FIG. 2 shows a portion of gas turbine rotor assembly 62, which includes rotor disc 64 with a plurality of circumferentially distributed rotor blades 66. Rotor blade 66 includes airfoil section 68, root section 70, leading edge 72, trailing edge 74, pressure surface 76, suction surface 78, radial retention slot 80, pressure side root bearing surface 82, disc teeth 86, forward bearing surface 88, aft bearing surface 90, retention ring 92, shim 94, contact relief region 96, and high load portion 98.

Certain embodiments of rotor assembly 62 are disposed in the hot section, such as high pressure turbine 54, or low pressure turbine 46 as shown in FIG. 1. Additionally or alternatively, rotor assembly 62 may be disposed in fan section 22, low pressure compressor section 44, and/or high pressure compressor section 50. Rotor blades 66, which include airfoil section 68 and root section 70, can be manufactured as a high temperature ceramic matrix composite (CMC). Alternatively, rotor blades 66 may be manufactured as an organic matrix composite (OMC). CMC and OMC blades are generally constructed from multiple plies of woven fiber and then infiltrated with a matrix to create a solid part. Due to reduced weight and moment of inertia, CMC and OMC blades can have a much simpler geometry of root section 70 as compared to typical metal blades, and can have a highly tapered airfoil section 68. One non-limiting example construction of a CMC blade is shown and described in detail below, with respect to FIG. 4.

It will be recognized that many of embodiments of rotor assembly 62 can include in inner diameter flow surface defined, for example, by a plurality of circumferentially distributed blade platforms. Such platforms may be integrally formed or secured to each blade 66 proximate the transition between airfoil section 68 and root section 70. However, to better illustrate other elements, any possible inner flow surface or blade platform has been omitted from the examples described herein.

Returning to FIG. 2, airfoil section 68 can include leading edge 72, trailing edge 74, pressure surface 76, and suction surface 78. Root section 70 can be a single root with circumferentially opposed bearing surfaces for securing blade 66 into a corresponding radial retention slot 80 of disc 64. Here, pressure side root bearing surface 82 and an opposing suction side bearing surface (not visible) mate with respective bearing surfaces (not numbered) of disc teeth 86, which define a longitudinal extent of slot 80. Root section 70 includes longitudinally facing forward bearing surface 88 and aft bearing surface 90 (not visible in FIG. 2). At least one of these longitudinally facing bearing surfaces can be secured using one or more retention rings 92, or alternatively using another bearing surface of the disc (not shown).

Shim 94 is disposed annularly between blade root section 70 and the corresponding radial retention slot 80. Under high centrifugal loads and operating temperatures, the frictional coefficient between the blade contact faces and disk 64 approaches a value of 1.0, effectively simulating bonded contact therebetween. Shim 94 cannot act as a sliding damper but may be used to reduce blade lock-up in these situations, and may act as a soft compliant layer between the CMC blade 66 and metal disc 64. A low modulus compliant layer can help reduce contact stress by flexing and eliminating point loading due to surface contact variations. Shim 94, an illustrative example of which is shown in FIGS. 3A-3D, also protects the CMC substrate of blade 66 and protective coatings on root section 70. Under certain designs and/or operating conditions, however, portions of root section 70 and teeth 86 (defining disc slot 80) are subjected to concentrated or nonuniform loads typically characterized by shear, bending, and bearing stresses concentrated around certain parts of the blade root and disc. To alleviate this, at least one contact relief region 96 can be aligned with corresponding high load portion(s) 98 of blade root section 70 in order to reduce the effects of these loads encountered during engine operation.

Figure 5A:
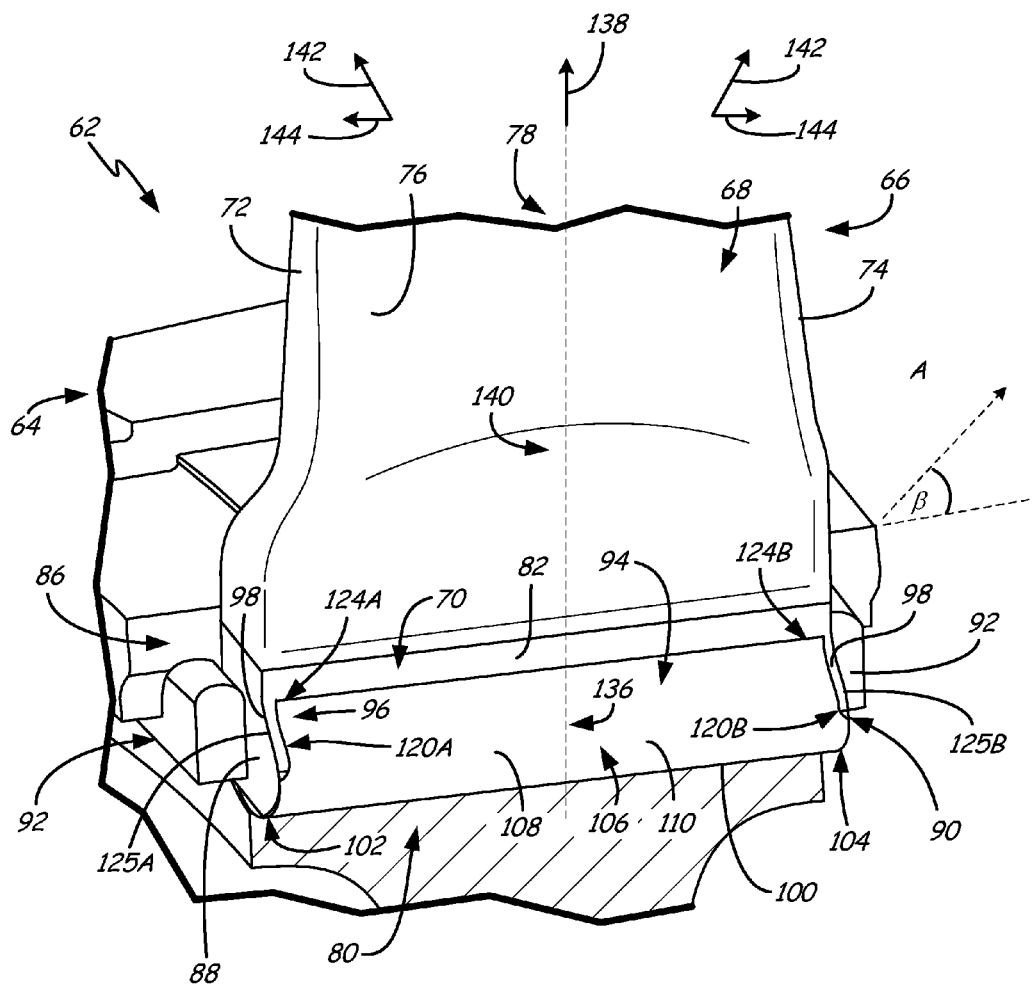
FIG. 5A isometrically depicts the turbine rotor assembly with a relief region of the shim positioned at a high load location of the assembly.
Figure 5B:
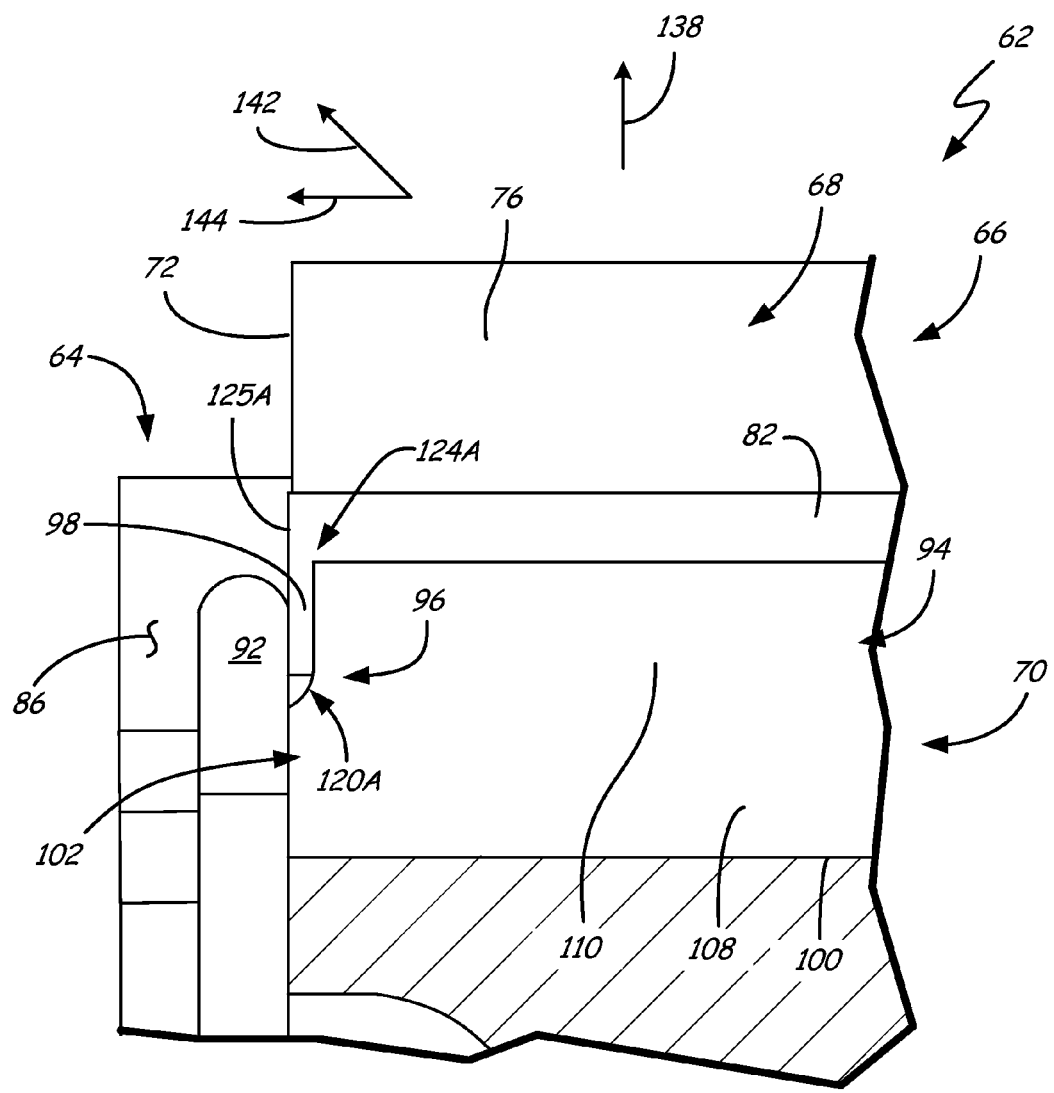
FIG. 5B is a side elevation of the turbine rotor assembly with a relief region of the shim positioned at a high load location of the assembly.

FIGS. 3A-3D depict an example embodiment of shim 94 which reduces the effects of loads caused by the tendency of blade 66 to untwist in response to rotation of the rotor assembly. These loads have been found to occur most often around the edges of longitudinal bearing surfaces (e.g., pressure side root bearing surface 82, and the suction side root bearing surface). In some blade designs, this is the fillet transition area. FIGS. 5A and 5B detail the effects of shim 94 on counteracting these loads.

Figure 3A:
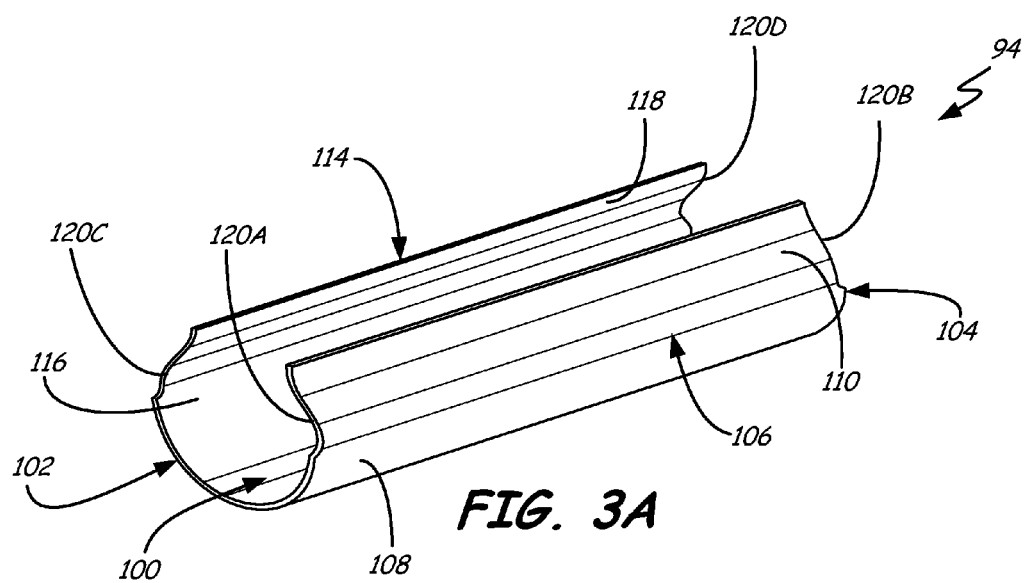
FIG. 3A is an isometric view of the shim.

FIG. 3A isometrically shows an example construction of blade root shim 94 with base 100, leading shim end 102, trailing shim end 104, pressure side shim wall 106, pressure side wall lower portion 108, pressure side wall upper portion 110, suction side shim wall 114, suction side wall lower portion 116, suction side wall upper portion 118, and contact relief cutouts 120A, 120B, 120C, 120D.

In this example, shim 94 includes base 100 extending longitudinally between leading shim end 102 and trailing shim end 104. Pressure side shim wall 106, corresponding to pressure side root bearing surface 82 (shown in FIG. 2), includes lower portion 108 curved upwardly and outwardly from the pressure side of base 100, and an upper portion 110 curved upwardly and inwardly from lower portion 108. Suction side shim wall 114, corresponding to suction side root bearing surface 84 (shown in FIG. 2), is spaced circumferentially apart from pressure side shim wall 106. Wall 114 includes a lower portion 116 curved upwardly and outwardly from the suction side of base 100, and an upper portion 118 of suction side shim wall 114 is curved upwardly and inwardly from lower portion 116. Base 100 is shown as being curved between the first and second shim walls transversely to the longitudinal shim direction. Base 100 may alternatively have a flat section that joins shim walls 106, 114.

As shown in FIG. 2, contact relief regions 96 can be aligned with high load portions 98 on blade root section 70. In this example, contact relief regions 96 include pressure side contact relief cutouts 120A, 120B formed into upper portion 110 of pressure side shim wall 106 at respective leading and trailing shim ends 102, 104. Similarly, suction side relief cutouts 120C, 120D are formed into upper portion 118 of suction side shim wall 114, also at respective leading and trailing shim ends 102, 104.

In one example, shim 94 can be punched from sheet metal then formed with the relief cutouts 120 perpendicular to the plate stock. With this method, contact relief cutouts 120 would appear as compound angles in the flat state so that when formed they meet design intent. Alternatively, the shim can be formed first and constrained as a nominal shape, then machine the relief cutouts 120 (via milling or electrodischarge machining).

Figure 3B:
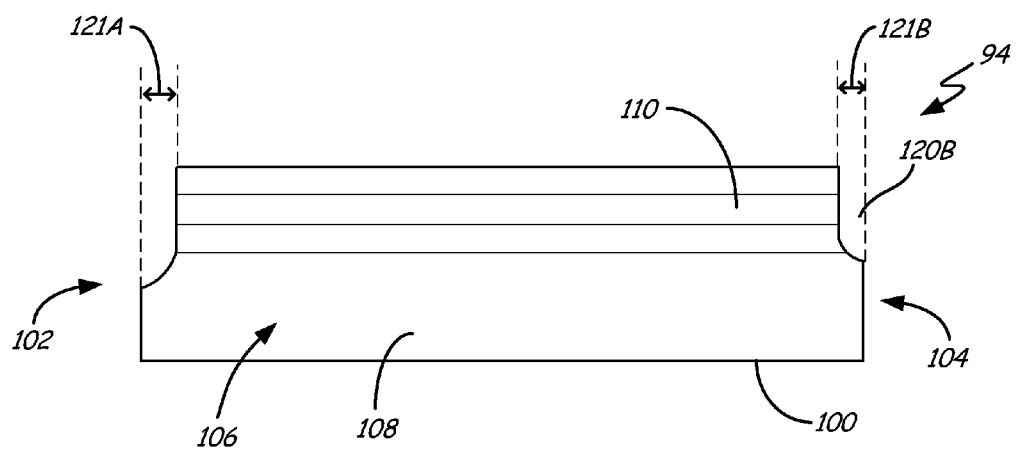
FIG. 3B is a side elevation view of the shim.

FIG. 3B is a side elevation view of shim 94 and also includes base 100, leading shim end 102, trailing shim end 104, pressure side shim wall 106, pressure side wall lower portion 108, pressure side wall upper portion 110, contact relief cutouts 120A, 120B, and longitudinal cutback dimensions 121A, 121B.

To illustrate non-limiting variations of possible contact relief cutouts, contact relief cutout 120A extends from the pressure side shim wall upper portion 110 into at least a part of the shim lower portion 108. In other words, the vertical dimension of contact relief cutout 120A is greater than that of upper portion 110 and thus extends below the apex of wall 106. In this example, contact relief cutout 120A also includes a longitudinal cutback dimension 121A measuring at least about 5% of a total longitudinal distance between leading shim end 102 and trailing shim end 104. Longitudinal cutback dimension 121A may be less than, equal to, or greater than longitudinal cutback dimension 121B. Thus, different embodiments of example shim 94 can have any arrangement of one or more relief cutouts 120A, 120B, 120C, 120D (shown in FIG. 3A) on upper portions of one or both shim walls, and at one or both shim ends 102, 104.

Contact relief cutouts can vary in size, position, and shape depending on the particular loads expected or experienced during operation. These and other variations allow tailoring of cutouts 120 in the contact relief region to accommodate the relative effective size of the bearing interface between root section 70 and disc slot 80 to the expected or empirically determined bearing, shear, and bending loads. This will be shown in detail in FIGS. 5A and 5B.

Figure 3C:
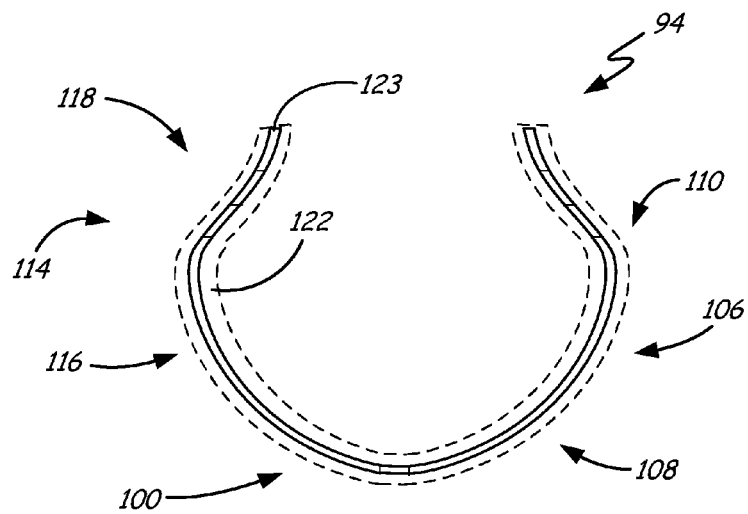
FIG. 3C is a sectional view of the shim.

FIG. 3C shows a cross-section of shim 94 and also includes base 100, pressure side shim wall 106, pressure side wall lower portion 108, pressure side wall upper portion 110, suction side shim wall 114, suction side wall lower portion 116, suction side wall upper portion 118, coating 122, and substrate 123. This view illustrates how certain resilient embodiments allow one or both walls 106, 114 to be bent back and then placed over root 70. Shim 94 generally conforms to blade root section 70 and substrate 123 may be a resilient high temperature nickel or cobalt alloy or a bimetallic structure such that shim 94 can be readily added and removed therefrom. Shim 94 may also optionally include a low-friction coating 122, such as mica or a sintered boronitride powder. Coating 122, disposed on one or both of the shim surfaces can simplify assembly of the shim with the blade and disc. Whether or not shim 94 is made from a resilient material, it may be installed first over the blade 66 before slot 66, or may be first inserted in the disc slot (shown in FIG. 2) prior to inserting the corresponding blade.

Figure 3D:
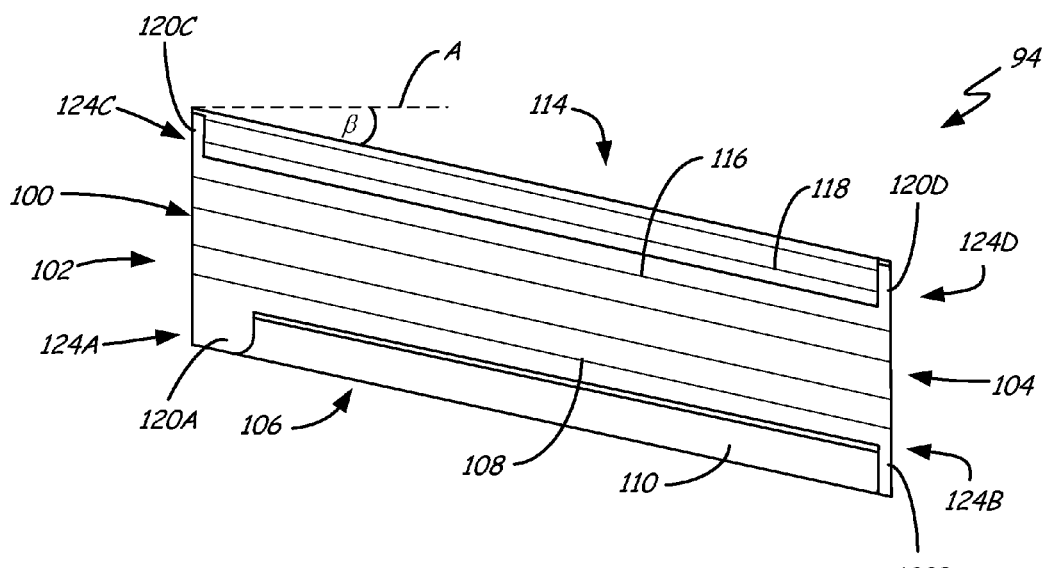
FIG. 3D is a top elevation view of the shim showing a broach angle.

FIG. 3D shows shim 94, and also includes base 100, leading shim end 102, trailing shim end 104, pressure side shim wall 106, pressure side wall lower portion 108, pressure side wall upper portion 110, suction side shim wall 114, suction side wall lower portion 116, suction side wall upper portion 118, contact relief cutouts 120A, 120B, 120C, 120D, and shim corners 124A, 124B.

Shim 94 can be adapted to a broach angle of a particular blade 66 and blade assembly 62. Shim 94 is provided with a broach angle $\beta$ that is substantially equivalent to the blade broach angle. With a zero broach angle $\beta$, shim longitudinal ends 102, 104 form right angles with walls 106, 114 at all four corners 124A, 124B, 124C, 124D. However, with a nonzero broach angle, these are offset from perpendicular by approximately the same amount as the shim and blade broach angles. For example, a blade broach angle of 5° can be accommodated by a similar shim broach angle $\beta$ of about 5° such that the angles at corners 124A, 124D are approximately 85° while corners 124B, 124C are approximately 95°. Tailoring the shim broach angle to approximate the blade broach angle allows longitudinal shim ends 102, 104 to remain in close contact (within tolerance) to retention ring(s) 92 as shown in FIGS. 5A and 5B.

Figure 4:
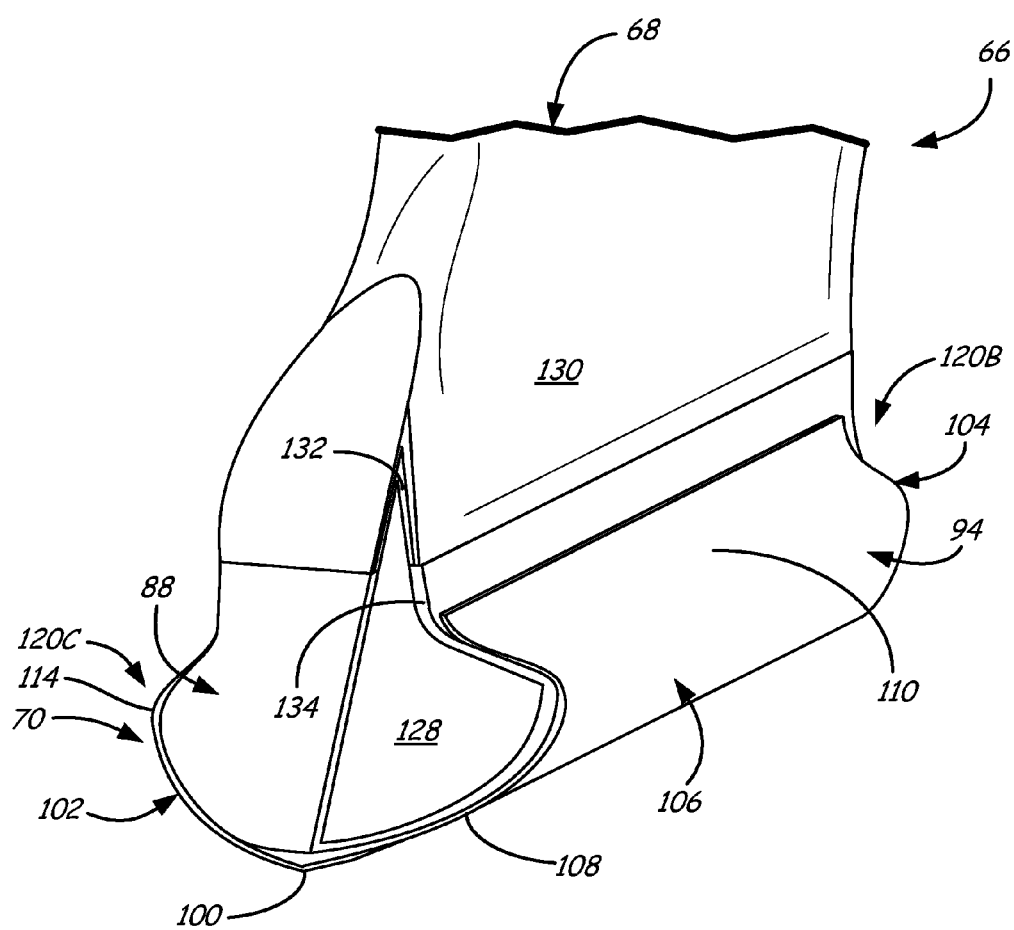
FIG. 4 is a cutaway portion of the blade and shim showing an example construction of the blade, root, and shim.

FIG. 4 shows a non-limiting example construction of a partially cut away blade and shim assembly including blade 66, airfoil section 68, root section 70, forward bearing face 88, shim 94, base 100, leading shim end 102, trailing shim end 104, pressure side shim wall 106, pressure side wall lower portion 108, pressure side wall upper portion 110, suction side shim wall 114, contact relief cutouts 120B, 120C, CMC substrate 128, environmental coating 130, bond layer 132, and root coating 134.

This example shows different layers susceptible to damage from high edge contact loading on different parts of root 70 such as may occur due to wedge effect, broach effect, or other operational stresses. Here, both airfoil section 68 and root section 70 comprise CMC substrate 128 with woven fibers retained in a ceramic matrix. To withstand turbine section temperatures, one or both of the woven fibers and the matrix component can be a silicon-based ceramic. In certain embodiments, CMC substrate 128 can be silicon carbide (SiC) fabric coated with boronitride (BN) particles, and encompassed within a SiC matrix. At high temperatures, the SiC matrix is rapidly oxidized into volatile compounds in reaction with either water vapor or oxygen from the combustion gas stream (core flow C). Airfoil section 68 and root section 70 therefore can include coatings or other protective sacrificial features which slow this reaction and extend the life of blade 66. Airfoil section 68, for example, can be coated with any suitable environmental barrier coating (EBC) 130 which may comprise aluminum and mullite. There may be a silicon-based bond layer 132 on airfoil section 68 between CMC substrate and the EBC.

Most EBC's available for use on airfoil section 68 are unsuitable for root section 70 due to the blade retention stresses. Thus CMC substrate 128 can be protected in other ways, such as by a stiff silicon-based root coating layer 134 disposed over CMC substrate 128. Root coating 134 may also comprise silicon but is a much less reactive species when exposed to the combustion gases in core flow C. As described in FIGS. 5A and 5B, this root coating 134 is susceptible to shearing, particularly when contact loading exists along the entire longitudinal extent of the attachment (i.e. a blade to disk interface excluding a shim, or a shim with no relief cuts). Shearing can expose the SiC substrate 128 in root section 70 to the combustion gas flow C around the interface of airfoil section 68 and root section 70, causing weakening and eventual failure of blade 66. Thus, shim 94 can include one or more cutouts in these areas to relieve this loading as shown in FIGS. 5A and 5B.

A portion of shim 94, such as base 100, may also be spaced apart from the root 70 so as to allow for thermal variation and relative sliding movement during operation of the engine. Shim walls 106 and 114 may alternatively be described as extending generally from a midpoint between the suction and pressure sides of shim 94. Base 100 would then be omitted, or considered integral with one or both shim walls 106, 114.

FIG. 5A is an isometric view of rotor assembly 62 with rotor disc 64, rotor blade 66, airfoil section 68, root section 70, leading edge 72, trailing edge 74, pressure surface 76, suction surface 78, radial retention slot 80, pressure side root bearing surface 82, disc teeth 86, forward bearing surface 88, aft bearing surface 90, retention rings 92, shim 94, contact relief regions 96, high load portion 98, shim base 100, shim ends 102, 104, pressure side shim wall 106, contact relief cutouts 120A, 120B, shim corners 124A, 124B, bearing face intersections 125A, 125B, blade root center 136, radial pull direction 138, radial disc sector 140, nonconcentric pull 142, and longitudinal pull component 144. FIG. 5B a circumferentially facing elevation view of a forward portion of rotor assembly 62.

FIGS. 5A and 5B depict blade assembly 62 with the relative locations of high load portions 98 typical of wedge effect and broach effect stresses in tapered and broached blades. To improve work extraction from the engine working fluid, certain embodiments of rotor assembly 62 can retain blades 66 at a nonzero broach angle $\beta$ defined as the angle that the longitudinal axis of the blade root section 70 (slot 80) is offset relative to the axial centerline A of engine 20 (shown in FIG. 1). The broach angle $\beta$ may be determined by the angle of the root chord and engine centerline A). However, higher broach angles, such as angles greater than about 5° off-axial, significantly increase shear loads around certain portions of the interface of root section 70 and radial retention slots 80. Nonzero broach angles increase nonuniform bearing loads along the interface of root section 70 and radial retention slot 80. At center 136 of slot 80, pull direction 138 of blade 66 is concentric with radial sector 140 of disc 64. But at the extreme end of slot 80, pull 142 can be at a larger angle that is not concentric with radial pull direction 138. This geometric phenomenon is known as "broach effect" and causes a torsional load around the axis of pull direction 138 resulting in torsional untwisting of the blade and a non uniform bearing loading across the bearing faces. "Wedge effect" may also cause increased contact loads on the root bearing surfaces due to the particular angle of root section 70 under radial pull loads. In this particular example, nonuniform loading is concentrated in root section 70 around bearing face intersections 125A, 125B. Depending on the precise taper, broach, and inertial moment of blade 66, one or more of these intersections 125A, 125B may be in high load portions 98 of root section 70.

To alleviate these and other effects, shim 94 includes contact relief regions 96, which may include one or more contact relief cutouts 120A, 120B, 120C, 120D. Turbine rotor assembly 62 can be assembled by placing shim 94 over root section 70 of rotor blade 66 with at least one contact relief region 96 aligned with high load location(s) 98. Shim 94 and rotor blade root section 70 are inserted into rotor disc 64 at radial retention slot 80 and secured into slot 80 with contact relief region(s) 96 aligned with corresponding high load location(s) 98 blade root section 70.

In this example, cutouts 120A, 120B, 120C, 120D are aligned with one or more bearing face intersections 125A, 125B so that the concentric radial pull forces are concentrated through center 136 when retaining the blade. The blade is then free to deflect in the nonconcentric pull directions 142 without concentrated loads. This reduces or eliminates a longitudinal component 144 of the nonconcentric pull 142 that would otherwise be focused on forward and aft bearing faces 88, 90 and through shim 94. It also reduces point loads at intersections 125A, 125B and reduces shearing of root coating 134 that would otherwise be caused by a shim without cutouts 120 aligned with the high load portions of root section 70.

In certain embodiments, it can be seen that base 100 and at least part of lower wall portions 108, 116 are in close proximity to retaining rings 82 disposed proximate forward and aft bearing faces 88, 90. Base 100 and lower wall portions 108, 116 axially retain shim 94 in slot 80 as well. Rings 92 do not necessarily abut base 100 or lower wall portions 108, but shim 94 is sized to allow for thermal expansion and contraction so that the blade assembly is retained with a minimum of longitudinal movement in the slot.

Discussion of Possible Embodiments

The following are non-exclusive descriptions of possible embodiments of the present disclosure.

A blade root shim comprises a base, a suction side shim wall, a pressure side shim wall, and a contact relief region.

The blade root shim of the preceding paragraph can optionally include, additionally and/or alternatively, any one or more of the following features, configurations and/or additional components:

A blade root shim according to an exemplary embodiment of this disclosure, among other possible things, includes a base, a suction side shim wall, a pressure side shim wall, and a contact relief region. The base extends longitudinally between a leading shim end and a trailing shim end. The suction side shim wall extends along the base and corresponds to a suction side blade root bearing surface. The pressure side shim wall, spaced circumferentially apart from the suction shim wall, corresponds to a pressure side blade bearing surface. The contact relief region is formed into an upper wall portion of either the suction side shim wall or the pressure side shim wall.

A further embodiment of the foregoing blade root shim, wherein the contact relief region is formed into the upper wall portion at either the leading shim end or trailing shim end.

A further embodiment of any of the foregoing blade root shims, comprising a plurality of contact relief regions, each contact relief region formed into the upper wall portion of at least one of the pressure side shim wall, and the suction side shim wall.

A further embodiment of any of the foregoing blade root shims, wherein the base is curved transversely to the longitudinal direction between the suction side shim wall and pressure side shim wall.

A further embodiment of any of the foregoing blade root shims, wherein at least one of the pressure side shim wall and the suction side shim wall includes a lower wall portion curved upwardly and outwardly from the base, and the upper wall portion is curved upwardly and inwardly from the lower wall portion.

A further embodiment of any of the foregoing blade root shims, wherein the contact relief region includes at least one cutout formed into both the upper wall portion and the lower wall portion.

A further embodiment of any of the foregoing blade root shims, wherein the contact relief region includes at least one cutout having a longitudinal dimension of at least about 5% of a longitudinal distance between the leading shim end and the trailing shim end.

A further embodiment of any of the foregoing blade root shims, wherein the pressure side shim wall and the suction side shim wall are arranged at a shim broach angle of at least about 5°.

A blade assembly comprises a blade having an airfoil section and a root section, and a shim disposed over at least a portion of the blade root section.

The blade assembly of the preceding paragraph can optionally include, additionally and/or alternatively, any one or more of the following features, configurations and/or additional components:

A blade assembly according to an exemplary embodiment of this disclosure, among other possible things, includes a blade having an airfoil section and a root section, and a shim disposed over at least a portion of the blade root section. The shim comprises a base, suction side and pressure side shim walls extending from the base, and a contact relief region aligned with a portion of the blade root section.

A further embodiment of the foregoing blade assembly, wherein the contact relief region is aligned with a high load portion of the blade root section.

A further embodiment of any of the foregoing blade assemblies, wherein the blade airfoil section and root section each comprise a ceramic matrix composite (CMC) substrate.

A further embodiment of any of the foregoing blade assemblies, wherein the CMC substrate comprises woven silicon carbide fibers coated with boronitride particles and retained in a silicon carbide matrix.

A further embodiment of any of the foregoing blade assemblies, further comprising at least one protective coating layer disposed over the root section comprising the CMC substrate.

A further embodiment of any of the foregoing blade assemblies, wherein the shim comprises a resilient metal substrate with a low friction coating layer disposed on at least one shim surface.

A further embodiment of any of the foregoing blade assemblies, wherein the blade airfoil section and root section each comprise a organic matrix composite (OMC) substrate.

A gas turbine rotor assembly comprises a plurality of rotor blades each including an airfoil section and a root section, a rotor disc, and a blade root shim.

The gas turbine rotor assembly of the preceding paragraph can optionally include, additionally and/or alternatively, any one or more of the following features, configurations and/or additional components:

A gas turbine rotor assembly according to an exemplary embodiment of this disclosure, among other possible things, includes a plurality of rotor blades each including an airfoil section, and a root section. The rotor disc includes a plurality of circumferentially distributed blade retention slots corresponding to the plurality of rotor blades, each retention slot having at least one bearing surface mating with a bearing surface disposed on the blade root sections. The blade root shim is disposed between one of the plurality of rotor blades and a corresponding blade retention slot, the blade root shim including a contact relief region formed into at least an upper portion of the blade root shim and aligned with a high load portion of the blade root section.

A further embodiment of the foregoing gas turbine rotor assembly, wherein the contact relief region is aligned with a high load portion of the blade root section.

A further embodiment of any of the foregoing gas turbine rotor assemblies, further comprising a retention ring secured around an longitudinal face of the rotor disc, and including at least one portion disposed immediately adjacent a longitudinal bearing face of the at least one blade root portion.

A further embodiment of any of the foregoing gas turbine rotor assemblies, wherein the plurality of blades and the corresponding plurality of radial retention slots are disposed at a broach angle of at least about 5° relative to an axial centerline of the rotor assembly.

A gas turbine engine comprising an embodiment of any of the foregoing blade assemblies, wherein the rotor assembly is disposed in a fan section of the gas turbine engine.

A gas turbine engine comprising an embodiment of any of the foregoing blade assemblies, wherein the rotor assembly is disposed in a turbine section of the gas turbine engine.

A gas turbine engine comprising an embodiment of any of the foregoing blade assemblies, wherein the rotor assembly is disposed in a fan section of the gas turbine engine.

A method according to an exemplary embodiment of this disclosure, among other possible things, includes placing a blade root shim having at least one contact relief region over root section of a ceramic matrix composite (CMC) rotor blade. The shim and the rotor blade root section are inserted into a rotor disc radial retention slot. The shim and the rotor blade root section are secured into the retention slot with the at least one contact relief region aligned with a corresponding at least one high load location of the blade root section.

The method of the preceding paragraph can optionally include, additionally and/or alternatively, any one or more of the following features, configurations and/or additional components:

A further embodiment of the foregoing method, wherein the at least one high load portion of the root section is located proximate an intersection of adjacent root bearing surfaces.

A further embodiment of any of the foregoing methods, wherein the blade root section is inserted at a broach angle of at least about 5° relative to an axial orientation of the rotor disc.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A blade root shim comprising
  a base extending longitudinally between a leading shim end and trailing shim end;
  a suction side shim wall extending along the base, the suction side shim wall corresponding to a suction side blade root bearing surface;
  a pressure side shim wall spaced circumferentially apart from the suction shim wall, the pressure side shim wall corresponding to a pressure side blade bearing surface; and
  a contact relief region formed into an upper wall portion of either the suction side shim wall or the pressure side shim wall;
  wherein at least one of the pressure side shim wall and the suction side shim wall includes a lower wall portion curved upwardly and outwardly from the base, and the upper wall portion is curved upwardly and inwardly from the lower wall portion; and
  wherein the contact relief region is formed into the upper wall portion of the at least one of the leading shim end and the trailing shim end.

2. The shim of claim 1, comprising a plurality of contact relief regions, each contact relief region formed into the upper wall portion of at least one of the pressure side shim wall, and the suction side shim wall.

3. The shim of claim 1, wherein the base is curved transversely to the longitudinal direction between the suction side shim wall and pressure side shim wall.

4. The shim of claim 1, wherein the contact relief region includes at least one cutout formed into both the upper wall portion and the lower wall portion.

5. The shim of claim 1, wherein the contact relief region includes at least one cutout having a longitudinal dimension of at least 5% of a longitudinal distance between the leading shim end and the trailing shim end.

6. The shim of claim 1, wherein the pressure side shim wall and the suction side shim wall are arranged at a shim broach angle of at least 5°.

7. A blade assembly comprising:
  a blade having an airfoil section and a root section; and
  a shim disposed over the blade root section, the shim comprising a base, suction side and pressure side shim walls extending from the base, a leading shim end, a trailing shim end, and a contact relief region aligned with a portion of the blade root section;
  wherein at least one of the pressure and suction side shim walls includes a lower wall portion curved upwardly and outwardly from the base, and the upper wall portion is curved upwardly and inwardly from the lower wall portion; and
  wherein the contact relief region is formed into the upper wall portion of at least one of the leading shim end and the trailing shim end.

8. The blade assembly of claim 7, wherein the contact relief region is aligned with a high load portion of the blade root section.

9. The blade assembly of claim 8, wherein the blade airfoil section and root section each comprise a ceramic matrix composite (CMC) substrate.

10. The blade assembly of claim 9, wherein the CMC substrate comprises woven silicon carbide fibers coated with boronitride particles and retained in a silicon carbide matrix.

11. The blade assembly of claim 9, further comprising at least one protective coating layer disposed over the root section comprising the CMC substrate.

12. The blade assembly of claim 7, wherein the shim comprises a resilient metal substrate with a low friction coating layer disposed on at least one shim surface.

13. The blade assembly of claim 7, wherein the blade airfoil section and root section each comprise a organic matrix composite (OMC) substrate.

14. A gas turbine rotor assembly comprising:
  a plurality of rotor blades each including an airfoil section, and a root section;
  a rotor disc including a plurality of circumferentially distributed blade retention slots corresponding to the plurality of rotor blades, each retention slot having at least one bearing surface mating with a bearing surface disposed on the blade root sections; and
  a blade root shim disposed between one of the plurality of rotor blades and a corresponding blade retention slot, the blade root shim including a contact relief region formed into at least an upper portion of the blade root shim and aligned with a portion of the blade root section;
  wherein at least one of a pressure side shim wall and a suction side shim wall includes a lower wall portion curved upwardly and outwardly from a base of the shim, and an upper wall portion which is curved upwardly and inwardly from the lower wall portion; and
  wherein the contact relief region is formed into the upper wall portion of at least one of a leading shim end and a trailing shim end.

15. The rotor assembly of claim 14, wherein the contact relief region is aligned with a high load portion of the blade root section.

16. The rotor assembly of claim 14, further comprising a retention ring secured around an longitudinal face of the rotor disc, and including at least one portion disposed immediately adjacent a longitudinal bearing face of the at least one blade root portion.

17. The rotor assembly of claim 14, wherein the plurality of blades and the corresponding plurality of radial retention slots are disposed at a broach angle of at least 5° relative to an axial centerline of the rotor assembly.

18. A gas turbine engine comprising a rotor assembly as recited in claim 14, wherein the rotor assembly is disposed in a fan section of the gas turbine engine.

19. A gas turbine engine comprising a plurality of rotor assemblies as recited in claim 14, wherein at least one of the plurality of rotor assemblies is disposed in a turbine section of the gas turbine engine.

20. A method of assembling a turbine rotor assembly, the method comprising:
   placing a blade root shim having at least one contact relief region over root section of a ceramic matrix composite (CMC) rotor blade, the at least one contact relief region formed into at least an upper portion of the blade root shim;
   inserting the shim and the rotor blade root section into a rotor disc radial retention slot; and
   securing the shim and the rotor blade root section into the retention slot with the at least one contact relief region aligned with a corresponding at least one location of the blade root section;
   wherein at least one of a pressure side shim wall and a suction side shim wall includes a lower wall portion curved upwardly and outwardly from the base, and an upper wall portion which is curved upwardly and inwardly from the lower wall portion; and
   wherein the at least one contact relief region is formed into the upper wall portion of at least one of a leading shim end and a trailing shim end.

21. The method of claim 20, wherein the at least one high load portion of the root section is located proximate an intersection of adjacent root bearing surfaces.

22. The method of claim 20, wherein the blade root section is inserted at a broach angle of at least 5° relative to an axial orientation of the rotor disc.

* * * * *